United States Patent
Calmels

(10) Patent No.: US 7,926,340 B2
(45) Date of Patent: Apr. 19, 2011

(54) HYBRID METHOD FOR ESTIMATING THE GROUND EFFECT ON AN AIRCRAFT

(75) Inventor: Benoit Calmels, Toulouse (FR)

(73) Assignee: Airbus France

( * ) Notice: Subject to any disclaimer, the term of this patent is extended or adjusted under 35 U.S.C. 154(b) by 126 days.

(21) Appl. No.: 12/485,140

(22) Filed: Jun. 16, 2009

(65) Prior Publication Data
US 2009/0314076 A1 Dec. 24, 2009

(30) Foreign Application Priority Data

Jun. 19, 2008 (FR) .................................. 08 03428

(51) Int. Cl.
*G01M 9/06* (2006.01)
*G01P 13/00* (2006.01)
(52) U.S. Cl. ........................................ 73/147; 73/170.02
(58) Field of Classification Search .................. None
See application file for complete search history.

(56) References Cited

U.S. PATENT DOCUMENTS

| | | | |
|---|---|---|---|
| 3,224,265 A | | 12/1965 | Mazelsky et al. |
| 3,250,121 A | * | 5/1966 | Schwartz .................. 73/178 H |
| 5,089,968 A | * | 2/1992 | Orgun et al. .................... 701/6 |
| 5,186,415 A | * | 2/1993 | Li ................................ 244/12.1 |
| 5,457,630 A | * | 10/1995 | Palmer ............................ 701/3 |
| 5,781,126 A | * | 7/1998 | Paterson et al. ............... 340/970 |
| 6,547,181 B1 | * | 4/2003 | Hoisington et al. ........... 244/46 |
| 2004/0065246 A1 | * | 4/2004 | Allen ............................ 114/274 |
| 2010/0268517 A1 | * | 10/2010 | Calmels ........................... 703/2 |
| 2010/0280802 A1 | * | 11/2010 | Calmels ........................... 703/2 |

FOREIGN PATENT DOCUMENTS

FR 2929724 A1 * 10/2009
RU 2 118 269 8/1998

* cited by examiner

*Primary Examiner* — Andre J Allen
(74) *Attorney, Agent, or Firm* — Novak Druce & Quigg; Gregory A. Nelson; Michael P. Byrne

(57) ABSTRACT

A method for assessing the aerodynamic ground effects on an aircraft. The method includes determining the variation of at least one aerodynamic coefficient of the aircraft as a function of the height for a range of heights extending from an aerodynamically infinite height to a zero height. In the method, (i) the range of heights is subdivided into at least two consecutive sets of heights; (ii) for one of the sets of heights, the variation of said aerodynamic coefficient is determined by wind tunnel tests using a model of the aircraft; and (iii) for the other of the sets of heights, the variation of said aerodynamic coefficient is determined by digital simulation reproducing by computation the physical reality of the air flow around said aircraft.

5 Claims, 2 Drawing Sheets

HYBRID METHOD FOR ESTIMATING THE GROUND EFFECT ON AN AIRCRAFT

CROSS-REFERENCE TO RELATED APPLICATION

This application claims the benefit of French Patent Application 08 03428, filed on Jun. 19, 2008, which is hereby incorporated by reference.

BACKGROUND OF THE INVENTION

The present invention relates to a method for assessing the aerodynamic ground effect on an aircraft. For such an assessment, it is already known to determine the variation of at least one aerodynamic coefficient, such as the buoyancy coefficient, the drag coefficient, the pitching moment coefficient, etc., as a function of the height of the aircraft, in a range of height values between a value that is sufficiently high for the ground effect to be zero or negligible (value generally referred to as "infinite height" by aerodynamics engineers) and a zero value for which the aerodynamic ground effect is generally maximum, since the aircraft is taxiing on the ground.

DESCRIBED OF THE PRIOR ART

To do this, it is normal to perform an experimental assessment of said aerodynamic coefficient by producing a model of said aircraft and by placing said model in a wind tunnel airstream limited by a floor simulating the ground, by a ceiling and by two lateral walls. Said aerodynamic coefficient is then measured for different heights of said model in the airstream and measurements are corrected using correction coefficients to take account of the fact that the aerodynamic field of the model is limited by said floor, said ceiling and said lateral walls. Then, the variation of said aerodynamic coefficient of the aircraft is assessed as a function of the height based on said corrected measurements, performed on the model.

Such an experimental assessment has the drawback that the correction level provided by said correction coefficients is generally high in relation to the measured values of said aerodynamic coefficient, mainly at the center of said stream, such that the corresponding measurements are relatively inaccurate and unreliable. Furthermore, for model safety reasons, said model is not made to approach said floor by less than a minimum safety height, so that said model cannot be damaged or destroyed by collision with the floor under the effect of the vibrations generated by the airstream. There is therefore a need to extrapolate the variation of said aerodynamic coefficient between this minimum safety height and the floor (the ground). Such an experimental assessment cannot therefore give direct measurements of the ground effect, at the point where the latter is precisely at its most intense.

Moreover, attempts have already been made to assess the aerodynamic ground effect on an aircraft by a digital simulation aiming to reproduce by computation the physical reality of the flow of air around said aircraft. However, such a digital assessment has not currently proved reliable enough and accurate enough to be able to do away with wind tunnel tests in the intermediate part of the range of heights at which the measurements are carried out.

The object of the present invention is to remedy these drawbacks.

SUMMARY OF THE INVENTION

To this end, according to the invention, the method for assessing the aerodynamic ground effect on an aircraft by determining the variation of at least one aerodynamic coefficient of said aircraft as a function of the height, for a range of heights extending from an aerodynamically infinite height to a zero height, is noteworthy in that:
 said range of heights is subdivided into at least two consecutive sets of heights;
 for one of said sets of heights, the variation of said aerodynamic coefficient is determined by wind tunnel tests using a model of the aircraft; and
 for the other of said sets of heights, the variation of said aerodynamic coefficient is determined by digital simulation reproducing by computation the physical reality of the air flow around said aircraft.

Thus, thanks to the present invention, it is possible, for each set of heights, to determine the variation of said aerodynamic coefficient as a function of the height with whichever of the two methods (experimental tests and computations) is the most accurate and the most reliable.

Preferably, said set of heights for which the variation of the aerodynamic coefficient is determined by digital simulation corresponds to the low heights close to the ground and/or to the high heights close to said aerodynamically infinite height.

In an advantageous exemplary implementation of the method according to the present invention:
 said range of heights is subdivided into three consecutive sets of heights;
 for that of these three consecutive sets which is in an intermediate position relative to the other two, the variation of said aerodynamic coefficient is determined by wind tunnel tests using said model; and
 for each of the other two sets, which are in a lateral position on either side of said intermediate set, the variation of said aerodynamic coefficient is determined by digital simulation.

More specifically, when the wind tunnel tests are carried out in an airstream limited by a floor simulating the ground, by a ceiling and by two lateral walls, said model being displaced heightwise in said airstream without, however, approaching said floor by less than a minimum safety height, advantageously:
 said intermediate set of heights in which the variation of said aerodynamic coefficient is determined by wind tunnel tests corresponds to a range of heights in said airstream extending from said minimum safety height to a height at least approximately equal to that of the center of said stream;
 a lateral set of heights in which the variation of said aerodynamic coefficient is determined by digital simulation corresponds to a range of heights in said airstream extending from the zero height to said minimum safety height; and
 the other lateral set of heights in which the variation of said aerodynamic coefficient is determined by digital simulation corresponds to a range of heights in said airstream extending from said height at least approximately equal to that of the center of said stream to the infinite height at which the ground effect is zero or negligible.

Thus, thanks to the hybrid method according to the present invention, the following benefits are obtained:
 a harmonious combination of computations and tests, by using the benefits of each of the methods: digital simulation provides the capacity to estimate the ground effect between infinity and the height of the center of the stream, on the one hand, and between the minimum height that can be reached in a wind tunnel and the ground, on the other hand; the wind tunnel tests, restricted between the height of the center of the stream and the minimum height that can be reached in a wind tunnel, provide the reliability and the accuracy of the experimental measurements;

a reduction of the weight of the wall corrections in the ground effect compared to the conventional methodology, notably when approaching the center of the stream, which is more acceptable from a methodological point of view;

replacement of the extrapolation to the full ground effect carried out in a purely mathematical manner in the conventional experimental methodology by digital simulation, which makes it possible to introduce physical principles into this contribution to the ground effect;

the possibility of using all types of digital simulation, which makes it possible in particular to incorporate the advances that will be made in the future in this field as and when they occur; and easy incorporation in the current processes: the new methodology does not in fact require any change, neither in the wind tunnel process nor in the experimental data.

BRIEF DESCRIPTION OF THE DRAWING

The figures of the appended drawing will give a clear understanding of how the invention can be implemented. In these figures, identical references designate similar elements.

DESCRIPTION OF THE PREFERRED EMBODIMENTS

Figure 1:
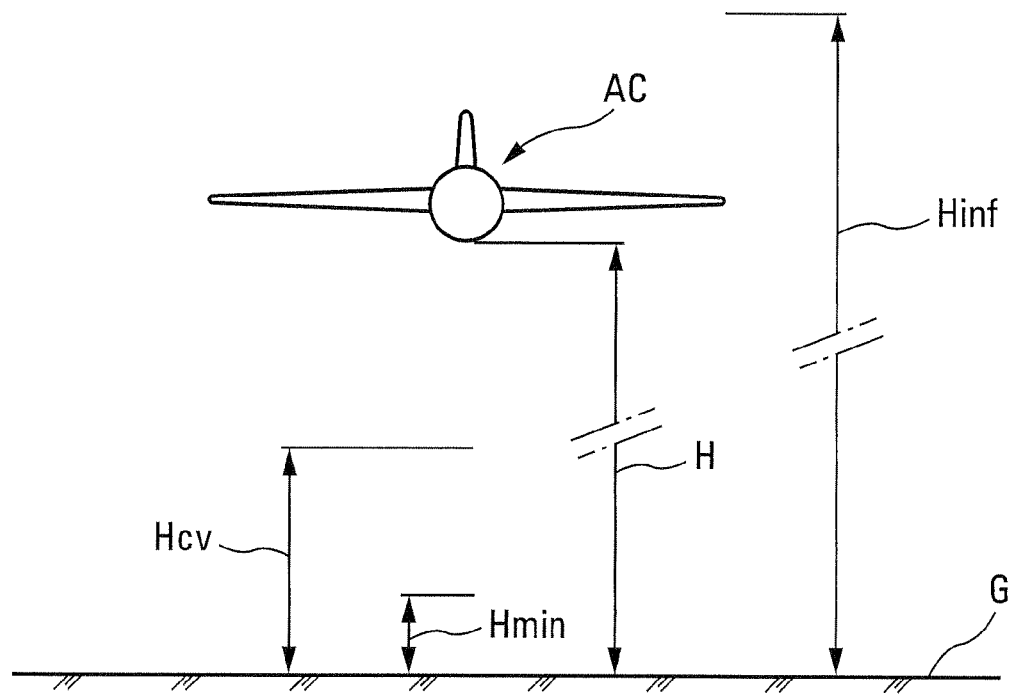
FIG. 1 diagrammatically illustrates an airplane above the ground.

FIG. 1 diagrammatically shows, from the front, an airplane AC above the ground G. The height H of the airplane AC relative to the ground G can vary from an infinite value Hinf, at which the aerodynamic ground effect is zero or negligible, to the zero value (the airplane AC is taxiing on the ground G) for which the aerodynamic ground effect is generally maximum.

To assess said aerodynamic ground effect, it is normal to determine the variation of at least one aerodynamic coefficient of said airplane AC, for example the buoyancy coefficient Cz, the drag coefficient Cx, the pitching moment coefficient Cm, and so on, between said infinite height Hinf and said zero value. Hereinbelow, in particular with regard to FIG. 3, said aerodynamic coefficient is designated by C and its variation by dC.

Figure 2:
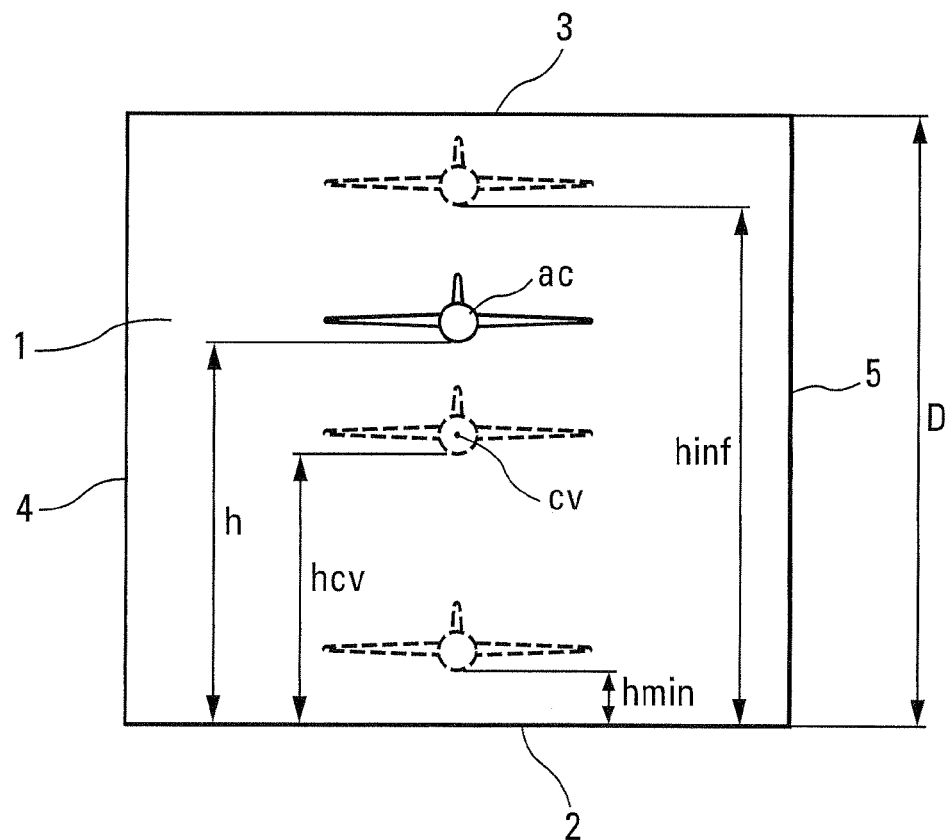
FIG. 2 diagrammatically shows a model of the airplane of FIG. 1 positioned in a wind tunnel airstream.

Also normally, to determine the variation dC of the aerodynamic coefficient C, a model ac of the airplane AC is established and positioned in a wind tunnel airstream 1 limited by a floor 2 simulating the ground G, by a ceiling 3, for which the distance D to the floor 2 can be sufficiently great to enable the simulation hinf of the infinite height Hinf, and by two lateral walls 4 and 5 (see FIG. 2).

The aerodynamic coefficient c of the model ac, corresponding to the coefficient C of the airplane AC, is measured for different heights h of said model ac less than the height hinf simulating the height Hinf of the airplane AC.

Since the wind tunnel stream 1 is limited by the floor 2, the ceiling 3 and the lateral walls 4 and 5, the aerodynamic field of the model ac is limited, so that it is normal to correct the measurements of the aerodynamic coefficient c of the model ac (so-called "wall correction"). Moreover, under the effect of the airstream 1, the model ac and/or the floor 2 present a risk of vibration, so that the model ac cannot be brought close to said floor 2 by less than a minimum measurement height hmin.

To remedy these drawbacks, in the example illustrated by the figures, only the measurements of the aerodynamic coefficient c performed between the center cv of the stream 1 (situated at a height hcv at least approximately equal to D/2) and the minimum height hmin are used.

Thus, between the heights hcv and hmin, the model ac makes it possible to obtain experimentally the variation dc of the aerodynamic coefficient c of the model ac as a function of the height h.

Based on this variation dc as a function of h, the intermediate part of the variation dC of the aerodynamic coefficient C is obtained for the airplane AC, between the height Hcv (corresponding to hcv) and the height Hmin (corresponding to hmin).

Figure 3:
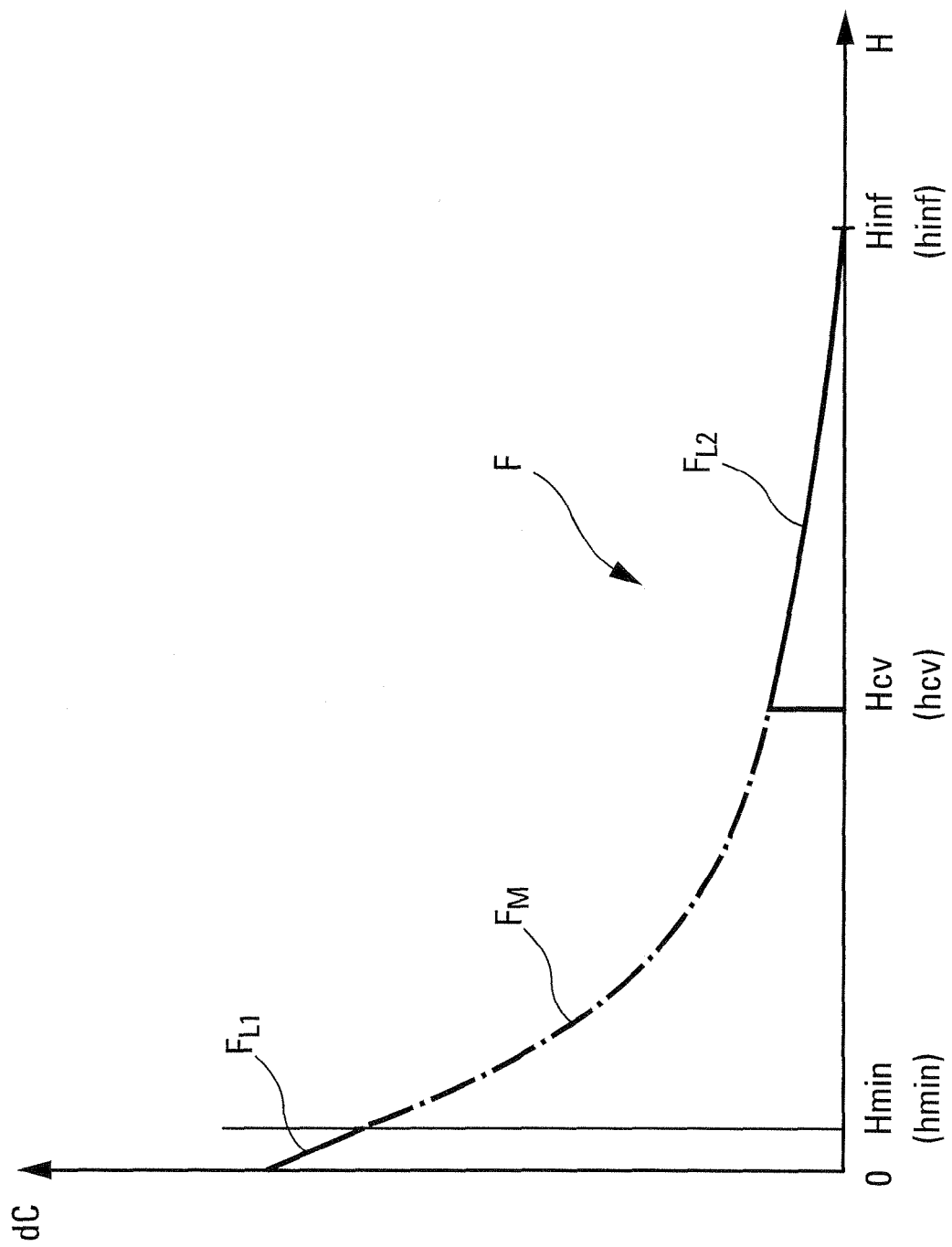
FIG. 3 is a diagram illustrating the method according to the present invention.

In FIG. 3, where the curve F illustrating the variation dC as a function of the height H is represented, this intermediate part obtained by the measurements in the wind tunnel stream 1 is represented by the portion $F_{M'}$ in chain-dotted lines, of the curve F.

On the other hand, the lateral parts $F_{L1}$ and $F_{L2}$ of the curve F, respectively corresponding to the ranges of heights O-Hmin and Hcv-Hinf, are obtained by digital computation as indicated hereinabove.

The invention claimed is:

1. A method for assessing the aerodynamic ground effect on an aircraft by determining the variation of at least one aerodynamic coefficient of said aircraft as a function of the height, for a range of heights extending from an aerodynamically infinite height to a zero height, in which:
   said range of heights is subdivided into at least two consecutive sets of heights;
   for one of said sets of heights, the variation of said aerodynamic coefficient is determined by wind tunnel tests using a model of the aircraft; and
   for the other of said sets of heights, the variation of said aerodynamic coefficient is determined by digital simulation reproducing by computation the physical reality of the air flow around said aircraft.

2. The method as claimed in claim 1, in which said set of heights for which the variation of said aerodynamic coefficient is determined by digital simulation corresponds to the low heights close to the ground.

3. The method as claimed in claim 1, in which said set of heights for which the variation of said aerodynamic coefficient is determined by digital simulation corresponds to the high heights close to said aerodynamically infinite height.

4. The method as claimed in claim 1, in which:
   said range of heights is subdivided into three consecutive sets of heights;
   for that of these three consecutive sets which is in an intermediate position relative to the other two, the variation of said aerodynamic coefficient is determined by wind tunnel tests using said model; and
   for each of the other two sets, which are in a lateral position on either side of said intermediate set, the variation of said aerodynamic coefficient is determined by digital simulation.

5. The method as claimed in claim 4, in which the wind tunnel tests are carried out in an airstream limited by a floor simulating the ground, by a ceiling and by two lateral walls, said model being displaced heightwise in said airstream without, however, approaching said floor by less than a minimum safety height,
in which:
said intermediate set of heights in which the variation of said aerodynamic coefficient is determined by wind tunnel tests corresponds to a range of heights in said airstream extending from said minimum safety height to a height at least approximately equal to that of the center of said stream;
a lateral set of heights in which the variation of said aerodynamic coefficient is determined by digital simulation corresponds to a range of heights in said airstream extending from the zero height to said minimum safety height; and
the other lateral set of heights in which the variation of said aerodynamic coefficient is determined by digital simulation corresponds to a range of heights in said airstream extending from said height at least approximately equal to that of the center of said stream to the infinite height at which the ground effect is zero or negligible.

* * * * *